Figure 1:
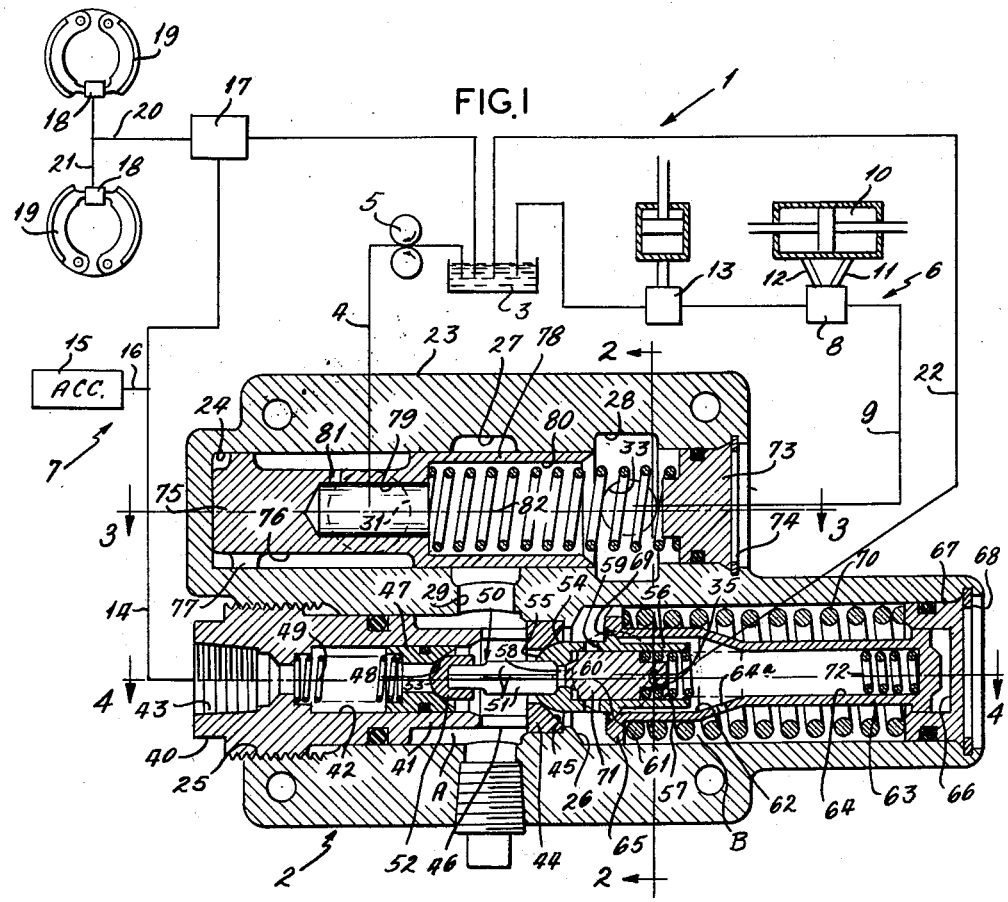

Dec. 5, 1961  R. E. SCHWARTZ ET AL  3,011,506
CONTROL VALVE
Filed Feb. 3, 1958  2 Sheets-Sheet 1

INVENTORS
ROBERT E. SCHWARTZ
EDWARD J. FALK
By Gravely, Lieder & Woodruff
ATTORNEYS.

United States Patent Office 3,011,506
Patented Dec. 5, 1961

3,011,506
CONTROL VALVE
Robert E. Schwartz, University City, and Edward J. Falk, St. Louis, Mo., assignors to Wagner Electric Corporation, St. Louis, Mo., a corporation of Delaware
Filed Feb. 3, 1958, Ser. No. 712,770
20 Claims. (Cl. 137—108)

This invention relates to fluid pressure systems and in particular to a control valve employed therein.

In the past, power brakes were usually incorporated in a closed center type fluid pressure system utilizing the advantages inherent thereto, such as operating said system with the engine stopped and availability of accumulated power to offset flow variations. In general, a closed center system is defined as having zero pressure fluid flow with an available potential of contained fluid pressure characterizing the dorment state thereof. The closed center valves or servo motors which control this type of system function to unleash the contained fluid pressure of said system by degrees causing pressure fluid flow into a power operated device to raise the fluid pressure thereof to some controlled portion of the available potential of the contained fluid pressure. Power steering and other balanced type serially connected motors were normally incorporated in an open center type fluid pressure system utilizing the inherent advantages thereof, such as the quick response action of an open center valve arrangement. In general, an open center system is defined as having a continuous pressure fluid flow with essentially no fluid pressure potential characterizing the dorment state thereof. The open center valves or servo motors which control this type of system function to throttle or restrict the continuous pressure fluid flow to generate fluid pressures in said system while not appreciably diminishing the volumetric rate of said pressure fluid flow. Heretofore, the open and closed center type systems were not successfully combined for use as a simple, unitary fluid pressure system having only one power source to fully utilize the inherent advantages of both of said systems.

One of the principal objects of the present invention is to provide a control valve which successfully combines the open and closed center type fluid pressure systems into a unitary fluid pressure system.

Another object of the present invention is to provide a control valve which permits the various valves of both the closed and open center type fluid pressure systems to be operable by a single power source.

A further object of the present invention is to provide a control valve which automatically regulates system priority to prevent pressure fluid starvation of the higher priority system, said pressure fluid starvation being the loss of pump volumetric efficiency due to high fluid pressures.

These and other objects and advantages will become apparent hereinafter.

Briefly, the present invention provides a fluid pressure system having an open center branch and a closed center branch which are compatably combined to be operable from a single power source. The power source usually provides a pressure fluid flow in excess of a predetermined pressure fluid flow needed to satisfy the demands of the open center branch, and a flow control valve maintains the above-mentioned pressure fluid flow in the open center branch at a predetermined rate while also being automatically operable to simultaneously divert the flow from the power source in excess of said predetermined rate to the closed center branch. In effect, the excess flow charges an accumulator, and when said accumulator is fully charged, this excess flow is automatically vented to a reservoir at atmospheric pressure. Meanwhile, as mentioned above, pressure fluid flow is maintained in the open center branch at the predetermined rate.

Figure 2:
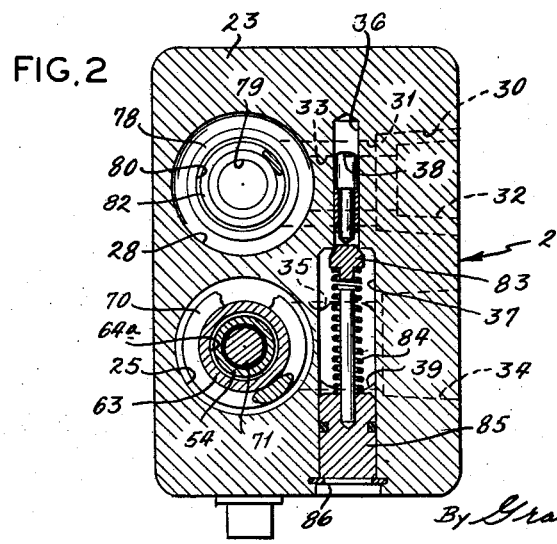
Figure 3:
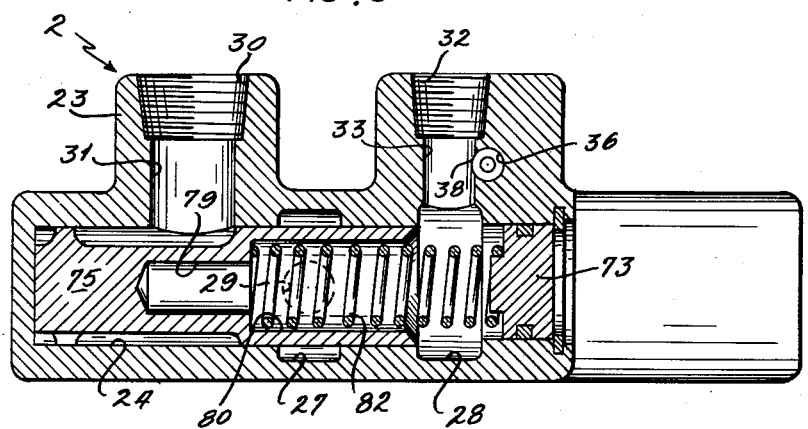
Figure 4:
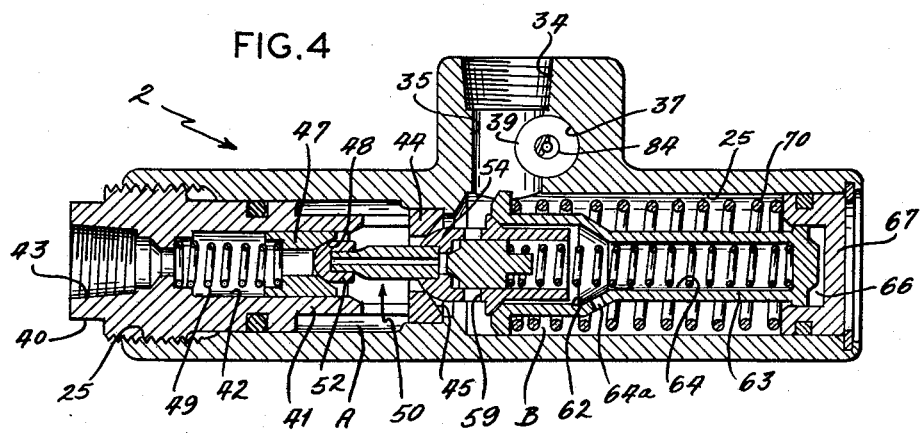

In the drawings:

FIG. 1 is a schematic diagram of a closed center type fluid pressure system combined with an open center type fluid pressure system showing the preferred embodiment of the present control valve in cross-section therein, FIG. 2 is a sectional view taken along line 2—2 in FIG. 1, FIG. 3 is a sectional view taken along the line 3—3 of FIG. 1, and FIG. 4 is a sectional view taken along the line 4—4 of FIG. 1.

Referring now to the drawings in detail, a fluid pressure system 1 is provided in which the inlet of a control valve 2 is connected to a substantially atmospheric reservoir 3 by a conduit 4 having a suitable pumping means 5 interposed therein. The pumping means 5 is normally driven by a variable speed device, such as a vehicle motor (not shown) and is preferably a positive displacement type pump in which the rate of delivery does not vary appreciably with the fluid pressure imposed thereon at any given speed of rotation but does vary proportionally with the speed of rotation of said pumping means 5. In addition, the fluid pressure system 1 is provided with an open center servo branch or system 6 and a closed center branch or system 7.

The open center branch 6 comprises at least one balanced, open center servo motor 8 serially connected in a conduit 9 which is interposed between the outlet port of the control valve 2 and the reservoir 3. Of course, the open center branch 6 readily lends itself to the incorporation of any number of balanced, open center type servo motors serially connected therein within the fluid pressure capacity of the pumping means 5, but for simplicity, only the open center servo motor 8 will be discussed hereinafter. The motor 8 is connected to an open center power operated device 10, such as a vehicle steering mechanism, by delivery and return conduits 11 and 12, respectively. An entirely different type of servo motor 13 is also shown in the drawings in contrast to the balanced type motor 8 and is serially connected in the conduit 9 between the motor 8 and the reservoir 3. This motor 13 is of the unbalanced type and is necessarily the last servo motor in the open center branch 6 relative to the pumping means 5 since the outlet side thereof must be afforded direct access to the reservoir 3 to obviate the possibility of a pressure differential, or ambient pressure, from other motors in the branch being imposed thereacross.

The closed center branch 7 comprises a conduit 14 interposed between the charging or working port of the control valve 2 and the reservoir 3 having a fluid pressure accumulator 15 connected thereto by another conduit 16. A closed center motor 17, such as a booster mechanism containing a closed center control valve controlling a fluid pressure motor, is connected in parallel in the conduit 14 having its inlet side in communication with the accumulator 15 and its return side in communication with the rservoir 3. The outlet side of the motor 17 is connected with a closed center power operated device or wheel cylinders 18 of wheel brake assemblies 19 by a conduit 20 which branches at 21. As well known in the art, any number of closed center motors may be connected in parallel with the motor 17 in the closed center branch within the limits of the pumping means 5; however, for simplicity, only the closed center motor 17 is discussed hereinafter. To complete the closed center branch 7 of the fluid pressure system 1, a return conduit 22 is interposed between the venting or exhaust port of the control valve 2 and the reservoir 3.

The control valve 2 is provided with a housing 23 having an upper bore 24, or flow control portion, and a lower bore 25, or accumulator charging portion, said lower bore having an integral shoulder 26 near the mid-portion thereof. Spaced, annular, metering grooves 27 and 28 are provided in the upper bore 24 near the mid-portion and adjacent the rightward end thereof, respectively; and, an opening or connecting passage 29, which serves as either another outlet port for the flow control portion 24 or an inlet port for the accumulator charging portion 25, connects the metering groove 27 with the lower bore 25 leftward of the shoulder 26 therein. An inlet port 30 which receives the conduit 4, as previously mentioned, is connected by an inlet passage 31 to the portion of the upper bore 24 substantially midway between the metering groove 27 and the leftward end of said upper bore, and an outlet port 32 which receives the conduit 9, as previously mentioned, is connected to the metering groove 28 by an outlet passage 33. An exhaust port 34, which receives the conduit 22, as previously mentioned, is connected by an exhaust passage 35 to the lower bore 25 rightward of the shoulder 26 therein. The housing 23 is also provided with a vertical check valve bore 36 and an axially aligned counterbore 37, said check valve bore 36 intersecting with the outlet passage 33 at 38 and said check valve counterbore intersecting with the exhaust passage 35 at 39.

A seal carrying closure member 40 is threadedly received in the leftward end of the lower bore 25 and provided with an integral reduced portion 41 which protrudes coaxially into said lower bore, said closure member and reduced portion having an axial bore 42 therethrough connecting with a charging port 43 in the leftward end of said closure member which receives the conduit 14, as previously mentioned. A sealing ring 44, having an axial frustoconical passage 45 therethrough which serves as a valve seat, is sealably positioned in the central portion of the lower bore 25 between the rightward end of the closure member 40 and the shoulder 26; and a plurality of slots 46 are provided through the rightward end of said closure member establishing communication between the bore 42 and said lower bore. In this manner, the sealing ring 44 divides the bore 25 into a left chamber A and a right chamber B. A seal carrying piston 47, in alignment with the sealing ring 44, is slidably received in the closure member bore 42 and is also provided with a frustoconical passage 48 therethrough which serves as a valve seat and is smaller in diameter than the seating ring valve seat 45. The compressive force of a spring 49 interposed between the leftward end of the piston 47 and the shoulder formed at the juncture of the bore 42 and the charging port 43 normally biases said piston rightwardly to sealably engage the valve seat 48 with a dumbbell type valve 50.

The dumbbell type valve 50 is provided with a central finned member 51 which carries a sealing element 52 on one end thereof having a spherical sealing surface 53 normally engaged with the cooperating valve seat 48 of the piston 47. The other end of the finned member 51 protrudes coaxially through the valve seat 45 of the ring 44 and another valve element 54 is fixedly received thereon. The valve element 54 if provided with a spherical sealing surface 55 which is normally engaged with the valve seat 45 of the ring 44, as will be discussed hereinafter, and an integrally formed sleeve 56 which protrudes rightwardly therefrom. An axial stepped bore 57 is provided through the valve element 54, and the rightward end of the finned member 51 is fixedly received in the smaller portion of said stepped bore, as previously mentioned. In this manner, a plurality of passages 58 are provided between the fins of the finned member 51 and the smaller portion of the stepped bore 57. A plurality of bleed-down passageways 59 intersect the sleeve 56 adjacent the shoulder in said stepped bore 57, and a circumferentially extending flange 60 is integrally provided near the mid-portion of the sleeve 56 having a spherical abutment surface 61 for valve alignment purposes, as will hereinafter be described. The valve element sleeve 56 protrudes coaxially into a counterbore 62 of a damping piston 63 which is axially aligned with a bore 64, and a vent passage 64a provides communication between said bore and counterbore and the lower bore 25. The damping piston 63 is provided with an annular guide 65 on one end which is slidable in the lower bore 25 while the other end thereof is slidably received in a recess 66 formed in a seal carrying closure member 67 which is fixedly positioned in the right end of said lower bore by a snap ring 68. An annular beveled seat 69 on the leftward end of the damping piston 63 is biased into abuting engagement with the spherical abutment or sealing surface 61 of the valve element flange 60 by a spring 70 interposed between the piston guide 65 and the closure member 67. In this manner, the compressive force of the spring 70 biases the dumbbell valve 50 leftwardly whereby the spherical surfaces 53 and 55 of the valve elements 52 and 54, respectively, sealably engage the cooperating valve seats 48 and 45. The spherical surfaces 53, 55 and 61 in engagement with the seats 48, 45, and 69, respectively, also serve to prevent cocking or misalignment of the dumbbell valve 50.

A pilot valve 71 is slidably received in the larger portion of the stepped bore 57 of the valve element 54 and normally biased into sealable engagement with the shoulder formed in said stepped bore by the compressive force of a spring 72 interposed between said pilot valve and the end wall of the damping piston bore 64. In this position, the pilot valve normally interrupts communication through the stepped bore 57 and closes the bleed-down passages 59 in the valve element sleeve 56. The pilot valve 71 serves to enhance snap-action or quick actuation of the dumbbell valve 50, and the compressive force of the spring 72 on said pilot valve limits the maximum fluid pressure obtainable from the pumping means 5.

A seal carrying closure member 73 is fixedly positioned in the right end of the upper bore 24 by a cooperating snap ring 74 and a flow control piston 75 is slidably received in said upper bore. The leftward portion of the flow control piston 75 is provided with an elongated, peripheral groove 76 which is always in communication with the inlet passage 31, and a plurality of axial slots 77 connect the groove 76 with the left end of said piston to obviate any dash pot affect between the left end of the piston and upper bore. The rightward portion of the flow control piston 75 forms a spool or sleeve 78 slidable in the upper bore 24, and said sleeve normally simultaneously controls the degree of restriction of the throttling groove 28 and the throttling groove 27. An axial bore 79 and counterbore 80 extends into the piston 75 from the rightward end thereof, and a permanently open orifice 81 of calibrated size is provided in the side wall of said piston continuously communicating the inlet passage 31 and elongated groove 76 with the piston bore and counterbore 79 and 80 and also with the portion of the upper bore 24 rightward of said piston. A compression spring 82 is positioned between the closure member 73 and the shoulder formed at the juncture of the piston bore and counterbore 79 and 80 and normally biases the flow control piston 75 into abutment with the left end wall of the upper bore 24 when the pumping means 5 is inoperative. It is desirable that the spring 82 has a rate as low as practical to maintain a substantially constant spring force at all positions of the piston 75.

In order to limit the maximum fluid pressure obtainable in the open center branch 6, a pressure relief valve 83 is normally biased into sealable engagement with the shoulder formed at the juncture of the bore and counterbore 36 and 37 by the compressive force of a spring 84 interposed between said relief valve and a seal carrying, closure assembly 85 positioned in the lower end of the counterbore 37 by a cooperating snap ring 86. Of course, the pressure relief valve 83 limits the maximum pressure differential in the open center branch 6; however, each motor in said open center branch could be provided with a separate relief valve, and the sum of the maximum pressure differential obtainable across each of said motors would be, in this case, the maximum pressure differential of said open center branch. As a matter of choice, we prefer the relief valve 83 to be an integral component of the control valve 2, as shown. It is also apparent that the flow control portion and the accumulator charging portion of the control valve 2 could have separate housing, but we prefer the combined housing 23, as shown.

Operation

In the operation, the component parts of the control valve 2 are positioned as above described with the pumping means 5 inoperative.

When the pumping means is operative and running at idling speed, the flow of pressure fluid therefrom is normally in excess of the predetermined rate demanded by the open center branch 6. Of course, the pressure fluid flow increases proportionally with the speed of the pumping means 5 with little regard to the fluid pressure imposed thereon; and, said flow to the open center branch 6 can be regulated by varying the size of the orifice 81, by varying the compressive force of the spring 82, or by varying the diameter of the flow control piston 75. In order to simplify the description of the operation, hereinafter the pressure fluid flow through the orifice 81 in the flow control piston 75 is considered to be downstream or orificed flow and that which does not pass through said orifice is considered to be upstream or excess flow.

At idling speeds, the pumping means 5 delivers pressure fluid to the upper bore 24 of the control valve 2 via the conduit 4 and the inlet port and passage 30 and 31, respectively, at a rate in excess of the predetermined rate demanded by the open center branch 6. As previously mentioned, the orifice 81 allows fluid pressure flow therethrough into the open center branch 6, that is through the flow control piston orifice 81 and the bore and counter bore 79 and 80, respectively, into the portion of the upper bore rightward of the flow control piston 75 and therefrom via the throttling groove 28, the outlet passage and port 33 and 32, respectively, into the conduit 9 and through the unrestricted, open center servo motors 8 and 13 back to the reservoir 3.

The predetermined rate of downstream flow necessary to satisfy the demands of the open center branch 6 establishes a predetermined pressure differential across the orifice 81 which is effective to cause rightward movement of the flow control piston 75 against the compressive force of the spring 82; however, when the upstream or excess flow momentarily increases, the downstream flow is also momentarily increased to a rate greater than the predetermined rate thereby momentarily increasing the predetermined pressure differential across the orifice 81 which causes further rightward movement of the flow control piston 75. As a result of this piston movement, the piston spool 78 uncovers the annular groove 27 allowing upstream flow access to the accumulator charging portion of the control valve 2; and in this manner, the downstream flow is decreased to the predetermined rate which, in turn, decreases the pressure differential across the orifice 81 to the predetermined amount. It should be noticed that the flow control piston 75 maintains its newly assumed position and that the rightward end of the spool 78 partially closes the annular groove 28 but yet not enough to materially throttle or restrict the predetermined rate of flow therethrough while the leftward end thereof controls and throttles the excess flow through the annular groove 27. The upstream flow proceeds from the annular groove 27 in the upper bore 24 via the connecting passage 29 into the chamber A of the lower bore 25 and through the slots 46 in the rightward end of the closure member 40 into the bore 42 thereof. The fluid pressure of the upstream flow acts on the effective area of the piston 47 to overcome the opposing compressive force of the spring 49 thereby moving said piston leftwardly to unseat the piston valve seat 48 from the sealing surface 53 of the dumbbell valve element 52 allowing upstream flow through the piston valve seat 48, the closure member bore 42, and the charging port 43 into conduits 14 and 16 from whence it enters accumulator 15 to be stored to accommodate the future fluid pressure demands of the closed center branch 7.

As the fluid pressure in the accumulator 15 increases, resistance to upstream flow is increased; and thereby, the downstream flow to the open center branch is momentarily increased to a rate greater than the predetermined rate along with the momentary increase in the pressure differential across the orifice 81 which causes the flow control piston 75 to move further rightwardly in the bore 24. As a result of the piston movement, the leftward end of the piston spool 78 uncovers the annular groove 27 allowing substantially unrestricted upstream flow therethrough; and, in this manner, the downstream flow is decreased to the predetermined rate which, in turn, decreases the pressure differential across the orifice 81 to the predetermined amount. In this newly assumed position, the rightward end of the spool 78 throttles the predetermined rate of flow through the annular groove 28 to establish a pressure differential thereacross and create a back pressure which is effective upstream to charge the accumulator 15. It should be noted that the spool 78 of the flow control piston 75 maintins a proper relationship with the annular grooves 27 and 28 when the accumulator 15 is unloaded and being charged, respectively, thereby maintaining equal pressure drops across the parallel branches 6 and 7 and, in addition, effecting a nearly constant pressure differential across the orifice 81 to maintain the predetermined rate of pressure fluid flow downstream.

Since the pressure differential between upstream and downstream flow is maintained as above described, as long as upstream flow exists, fluid pressure builds up and charges the accumulator 15 until the unloading or maximum predetermined fluid pressure is reached. This maximum fluid pressure is also present in the chamber A of the lower bore 25 and acts on the pilot valve 71 via the passage 58 in the valve element 54 to overcome the compressive force of the spring 72 and unseat said pilot valve. Consequently, after the pilot valve 71 is unseated, the fluid pressure acts on the entire area thereof to move said pilot valve rightwardly in the piston counterbore 57 thereby further compressing the spring 72 and eventually uncovering or opening the relief or bleed-down passages 59 in the valve element sleeve 56. Uncovering the bleed-down passages 59 affords limited access of the excess pressure fluid flow in chamber A to the reservoir 3 via said bleed-down passages, the chamber B, the venting passage and port 35 and 34, respectively, and the return conduit 22. In this manner, the fluid pressure in chamber A is gradually reduced a predetermined amount enabling the compressive force of the spring 49 plus the force of the accumulator fluid pressure acting on the effective area of the left side of the piston 47 to move said piston rightwardly to sealably engage the piston valve seat 48 with the sealing surface 53 of the valve element 52. As a result, a pressure differential is created across the piston 47 which effects rightward concert movement of said piston, the dumbbell valve 50, and the piston 63 against the compressive force of the spring 70 to unseat the sealing surface 55 of the larger valve element 54 from the valve seat 45 of the bore dividing ring 44. Since the radial flange 60 of the valve element 54 is always in abutment with the guide 65 of the piston 63, this rightward movement will continue until said piston abuts the end wall of the recess 66 in the closing member 67.

The fluid pressure in chamber A is now afforded unlimited access to the atmospheric reservoir 3 via the bore divider valve seat 45, the chamber B, the venting passage and port 35 and 34, respectively, and the return conduit 22; and, the upstream pressure fluid flow now by-passes the accumulator 15. As a result the fluid pressure in chambers A and B is equalized, and the compressive force of the spring 72 moves the pilot valve 71 to the left and once again closes the bleed-down passages 59 and seats said pilot valve to close the passages 58. When the pumping means 5 is unloaded, as described above, the downstream flow is momentarily decreased below the predetermined rate along with a decrease in the pressure differential across the orifice 81, and the compressive force of the spring 82 moves the flow control piston 75 leftwardly in the bore 24. In this manner, the piston 75 assumes a new position so that the leftward end of the spool 78 once again throttles the excess or downstream pressure fluid flow through the annular groove 27 while the rightward end thereof uncovers the annular groove 28 to allow unrestricted upstream flow at the predetermined rate. As a result, the pressure differential between the upstream and downstream flow is just enough to maintain the predetermined rate of pressure fluid flow through the open center branch 6.

In order to attain quick-opening or snap-action opening when the larger valve element 54 of the dumbbell valve 50 is unseated, the effective area of the piston 47 when sealably engaged with the smaller valve element 52 is necessarily greater than the effective area of the larger valve element 54 when sealably engaged with the valve seat 45. This being the case, a greater force is afforded to oppose the compressive force of the spring 70 and to impart a rapid opening movement or snap-action to the dumbbell valve 50 after the pilot valve 71 has reduced the fluid pressure in chamber A a predetermined amount in order to create a pressure differential across the piston 47 and initiate the unloading of the pumping means 5. The difference in the effective areas, as above mentioned, also allows the fluid pressure in the accumulator 15 to drop below the maximum or unloading pressure thereby providing an operating span for said accumulator.

When the vehicle operator actuates the closed center motor 17, pressure fluid flows from the accumulator 15 through the conduits 16 and 14 to actuate said motor which, in turn, displaces brake operating pressure fluid via the conduits 20 and 21 into wheel cylinders 18 to establish a fluid pressure therein to actuate wheel brake assemblies 19. When the desired rate of deceleration has been attained or a stop completed, the vehicle operator releases the motor 17 allowing return flow of the brake operating pressure fluid from the wheel cylinders 18 to the motor 17 via conduits 21 and 20, and the motor 17 exhausts the actuating fluid pressure therefor to the atmospheric reservoir 3 via the conduit 14. When the fluid pressure in the accumulator 15 is reduced to a predetermined minimum by the use of the motor 17 or other closed center devices, the compressive force of the spring 70 overcomes the predetermined minimum fluid pressure acting on the effective area of the left side of the piston 47 plus the compressive force of the spring 49; and in this manner the piston 63, the dumbbell valve 50, and the piston 47 are moved leftwardly in concert to sealably engage the sealing surface 55 of the larger valve element 54 with the cooperating valve seat 45. Snap action is inherent during this operation since the restriction produced at seat 45 causes the force of the fluid pressure acting on the smaller area of dumbbell surface 55 to oppose the spring 70 while the pressure created by said restriction in chamber A acts on the effective area of the rightward end of piston 47. As a result, communication between chamber A and chamber B is interrupted whereby the excess flow effects the repositioning of the flow control valve 75, as previously described, so that the rightward end of the spool 78 throttles the predetermined rate of flow through the annular groove 28 to establish a pressure differential thereacross which once again creates a back pressure effective upstream and consequently in the chamber A of the lower bore 25. When the force of the fluid pressure in chamber A acting on the effective area of the rightward end of the piston 47 overcomes the force of the fluid pressure in the accumulator 15 acting on the effective area of the leftward end of the piston 47 plus the compressive force of the spring 49, the piston 47 moves leftwardly in the bore 42 to disengage the valve seat 48 from the sealing surface 53 of the dumbbell valve element 52 and, thereby reinitiates the accumulator charging cycle, as previously described.

When the accumulator 15 is being charged creating a demand fluid pressure in the closed center branch 7, the flow control piston 75 is positioned to meter or throttle the downstream pressure fluid flow through the annular groove 28 in the upper bore 24. As the motors 8 and 13 in the open center branch 6 are put into operation, the downstream flow therethrough is throttled creating pressure differentials across each of said motors which are additive to establish a back pressure or a demand fluid pressure in the open center branch 6, which is effective on the pumping means 5. This demand fluid pressure of the open center system 6 is not additive to the demand fluid pressure of the closed center system 7, but on the contrary, is a part of the demand fluid pressure in said closed center system. The operation of motors 8 and 13 has little effect on the position of the flow control valve 75 until the demand fluid pressure of the open center branch 6 equals or becomes greater than the demand fluid pressure of the closed center branch 7. When this occurs, the resistance encountered by the downstream flow due to the throttling action of the motors 8 and 13 momentarily reduces the predetermined rate of flow through the orifice 81 which, of course, is accompanied by a momentary reduction of the predetermined pressure differential across said orifice. In this manner, the compressive force of the spring 82 overcomes the force of the reduced pressure differential across the orifice 81 acting on the effective area of the piston 75 to reposition said piston leftwardly in the bore 24. As a result of this piston movement, the piston spool 78 throttles the upstream flow through the annular groove 27 decreasing said upstream flow in excess of the predetermined rate; and in this manner, the downstream flow is again increased to the predetermined rate which also increases the pressure differential across the orifice 81 to the predetermined amount. As previously, the flow control piston 75 maintains its newly assumed position so that the rightward end of the spool 78 allows substantially unrestricted flow through the annular groove 28 at the predetermined rate while the leftward end thereof controls and throttles the upstream or excess flow through the annular groove 27. Thus, it is apparent that priority is afforded the servo motors in the open center branch 6 and that the accumulator charging cycle is temporarily impeded and in some cases precluded, so as not to starve the motors 8 and 13 of pressure fluid during an application thereof. This priority feature also prevents overloading of the pumping means 5 by preventing the sum of the demand fluid pressures of the open and closed center branches 6 and 7 from being imposed simultaneously on the pumping means 5.

When the demand fluid pressure of the open center branch 6 is reduced below that of the closed center branch 7, such as by taking the motors 8 and/or 13 out of operation, the predetermined downstream flow through the orifice 81 is again momentarily increased along with the predetermined pressure differential across said orifice which causes the flow control piston 75 to move rightwardly in the bore 24. As a result, the leftward end of the piston spool 78 once again uncovers the annular groove 27 allowing unrestricted upstream flow therethrough, and in this manner, the downstream flow is decreased to the predetermined rate which in turn decreases the pressure differential across the orifice 81 to the predetermined amount. In this reassumed position, the rightward end of the spool 78 throttles the predetermined rate of flow through the annular groove 28 establishing the back pressure which is effective upstream to reinitiate the charging cycle of the accumulator 15. Upon completion of the accumulator charging cycle and the operation of the motors 8 and 13, the pumping means 5 is unloaded, as previously described.

From the above, it is apparent that the control valve 2 affords the open center branch 6 flow priority over the closed center branch 7. If at any time during the operational phases of the control valve 2 the demand fluid pressure of the open center branch 6 exceeds that of the closed center branch 7, the predetermined fluid pressure differential between the upstream and downstream flows is reduced, and the compressive force of the spring 82 will position the flow control piston 75 so that the spool 78 thereof allows substantially unrestricted downstream flow through the annular groove 28 to the open center branch 6 while controlling and restricting the upstream flow through the annular groove 27 to the closed center branch 7.

Thus, it is apparent that there has been provided novel means for operating open center and closed center fluid pressure systems from a single power source which fulfills all the objects and advantages sought therefor. It is to be understood, however, that the foregoing description and the accompanying drawings have been presented only by way of illustration and example and that changes, alterations, and modifications to the present disclosure which will be readily apparent to one skilled in the art are contemplated as being within the scope of the present invention which is limited only by the claims which follow.

What we claim is:

1. In a fluid pressure system having an open center branch and a closed center branch, a fluid pressure source, and means controlling the flow from said source to said open and closed center branches, said means comprising orificed valve means responsive to an increase or decrease in the flow from a predetermined rate to said open center branch to concurrently adjust in opposite senses the rate of flow to said closed center branch and open center branch, and means responsive to a predetermined pressure in said closed center branch to preclude flow thereto.

2. A fluid pressure system comprising an open center branch and a closed center branch, a fluid pressure source, means controlling the flow from said source to said open and closed center branches, said means being responsive to a predetermined pressure difference between said open and closed center branches to maintain a predetermined rate of flow in said open center branch and divert the flow in excess of said predetermined rate to said closed center branch, and means responsive to a predetermined minimum pressure and a predetermined maximum pressure in said closed center branch to direct the excess flow into said closed center branch and vent said excess flow to atmospheric pressure, respectively.

3. A fluid pressure system comprising an open center branch and a closed center branch, a fluid pressure source, orificed valve means maintaining a predetermined rate of flow from said source to said open center branch and diverting said flow in excess of said predetermined rate, other valve means for normally venting said flow in excess of said predetermined rate to atmospheric pressure, and means for moving said other valve means to direct said flow in excess of said predetermined rate into said closed center branch upon a predetermined minimum pressure in said closed center branch.

4. A fluid pressure system comprising an open center branch and a closed center branch, a fluid pressure source, orificed valve means maintaining a predetermined rate of flow from said source to said open center branch and diverting said flow in excess of said predetermined rate to said closed center branch, means for storing the excess flow in said closed center branch under fluid pressure, other valve means for controlling the excess flow, means responsive to a predetermined maximum pressure in said closed center branch for moving said other valve means to vent the excess flow to atmospheric pressure, and means for moving said other valve means to direct the excess flow for storage in said closed center branch upon a predetermined minimum pressure in said closed center branch.

5. A fluid pressure system comprising an open center branch and a closed center branch separate from each other, a single fluid pressure source for said open and closed center branches, a flow control valve connecting said open and closed center branches in parallel with said fluid pressure source, orifice means in said flow control valve to maintain a predetermined rate of flow from said source to said open center branch, said flow control valve being responsive to a pressure differential across said orifice means to normally divert said flow in excess of said predetermined rate from said source to said closed center branch, an accumulator adapted to store the excess flow diverted into said closed center branch under fluid pressure, a valve movable between two positions to control the excess flow, resilient means for biasing said valve to a first position to direct the excess flow into said open center branch for storage in said accumulator upon a predetermined minimum pressure in said closed center branch, and valve seating means responsive to a predetermined maximum pressure in said closed center branch for sealable engagement with said valve to preclude flow into said closed center branch and to move said valve to a second position whereby said excess flow is vented to atmospheric pressure.

6. In a fluid pressure system having an open center branch and a closed center branch, a fluid pressure source, and means for connecting said branches in parallel with said fluid pressure source, said means comprising a flow control valve, restricted orifice means in said flow control valve to establish continuous flow from said source to said open center branch, said flow control valve being responsive to a pressure differential across said restricted orifice means above or below a predetermined amount to concurrently adjust the flow to said branches in opposite senses whereby the flow to said open center branch is maintained substantially at a predetermined rate and the flow in excess of said predetermined rate is diverted to said closed center branch, an accumulator for storing the excess flow diverted into said closed center branch, and valve means responsive to the pressure differential across said closed center branch above a predetermined amount to vent said excess flow to atmosphere and below a predetermined amount to direct said excess flow to said accumulator for storage in said closed center branch.

7. A charging valve comprising a housing having inlet, charging, and exhaust ports, valve means controlling communication between said inlet, charging and exhaust ports, means responsive to a pressure differential between said inlet and charging ports above a predetermined amount to normally maintain said valve means in a first position establishing communication between said inlet and exhaust ports, means operable when said pressure differential falls below the predetermined amount to move said valve means to a second position interrupting communication between said inlet and exhaust ports, said second named means operable to establish communication between said inlet and charging ports when the pressure at the inlet port exceeds the pressure at the charging port, and means responsive to a predetermined pressure at the inlet port to establish limited communication between said inlet and exhaust ports, said second named means operable to interrupt communication between said inlet and charging ports when the pressure at the inlet port falls below the pressure at the charging port and to return said valve means to the first position.

8. A charging valve comprising a housing having inlet, charging and exhaust ports, valve means controlling communication between said inlet, charging, and exhaust ports and having spaced sealing surfaces thereon, a valve seat between said inlet and exhaust ports, a valve member responsive to a pressure differential between said inlet and charging ports above a predetermined amount to normally maintain engagement wtih one sealing surface and disengage the other sealing surface from said valve seat, means operable when said pressure differential falls below the predetermined amount to engage said other sealing surface with said valve seat, said valve member operable to disengage said one sealing surface when the inlet pressure exceeds the charging pressure, a passage in said valve means across said other sealing surface, a pilot valve normally closing said passage and responsive to a predetermined inlet pressure to establish limited communication between said inlet and exhaust ports, said valve member operable to reengage said one sealing surface and disengage said other sealing surface from said valve seat when the inlet pressure falls below the charging pressure.

9. A charging valve comprising a housing having an inlet port connected with a fluid pressure source, a charging port connected with an accumulator for fluid pressure, and an exhaust port connected with a substantially atmospheric reservoir, valve means controlling communication between said inlet, charging, and exhaust ports and having spaced sealing surfaces thereon, a valve seat between said inlet and exhaust ports, a valve member between said inlet and charging ports normally engaged with one sealing surface to interrupt communication between said inlet and charging ports, said valve member responsive to a pressure differential between said inlet and charging port above a predetermined amount to normally disengage the other sealing surface from said valve seat to establish communication between said inlet and exhaust ports, resilient means operable when the pressure differential falls below the predetermined amount to engage said other sealing surface with said valve seat interrupting communication between said inlet and exhaust ports, said valve member operable to disengage said one sealing surface and establish communication between said inlet and charging ports when the inlet pressure exceeds the charging pressure, a passage in said valve means across said other sealing surface, a normally closed pilot valve controlling fluid flow in said passage and responsive to a predetermined inlet pressure to establish limited communication between said inlet and exhaust ports, said valve member operable to re-engage said one sealing surface to interrupt communication between said inlet and charging ports when the inlet pressure falls below the charging pressure and to disengage said other sealing surface from said valve seat to establish unlimited communication between said inlet and exhaust ports.

10. A charging valve comprising a housing having a bore therein, a stationary valve seat dividing said bore into first and second chambers, inlet and charging ports in said first chamber and an exhaust port in said second chamber, a movable valve seat slidable in said first chamber between said inlet and charging ports, valve means having spaced sealing surfaces thereon extending between said chambers, said movable valve seat responsive to a pressure differential above a predetermined amount between said inlet and charging ports to sealably engage one of said sealing surfaces and disengage the other of said sealing surfaces from said stationary valve seat, a damping piston slidable in said second chamber, resilient means normally biasing said damping piston into abutment with said valve means to impede movement thereof, said resilient means operable to engage said other of said sealing surfaces with said stationary valve seat when the pressure differential decreases below the predetermined amount, said movable valve seat operable to disengage said one of said sealing surfaces when the inlet pressure exceeds the charging pressure, a passage in said valve means across said other of said sealing surfaces, and a pilot valve normally closing said passage and responsive to a predetermined inlet pressure to reduce said inlet pressure a limited amount, said movable valve seat operable to re-engage said one of said sealing surfaces and subsequently disengage said other of said sealing surfaces from said stationary valve seat when the inlet pressure is reduced below the charging pressure.

11. A charging valve for a fluid pressure system comprising a housing having a bore therein, a first valve seat dividing said bore into first and second chambers, an inlet port in said first chamber in communication with a source of fluid pressure, a charging port in said first chamber spaced from said inlet port and in communication with an accumulator for fluid pressure, and an exhaust port in said second chamber in communication with a substantially atmospheric reservoir, a first piston slidably received in said first chamber between said inlet and outlet ports, an axial passage through said first piston terminating in a second valve seat, valve means extending between said chambers and having interconnected first and second sealing surface, said first piston responsive to a pressure differential above a predetermined amount between said inlet and charging ports to engage said second valve seat with said second sealing surface and disengage said first sealing surface from said first valve seat, a second piston slidably received in said second chamber, resilient means to bias said second piston into abutment with said valve means to dampen movement thereof, said resilient means operable to move said second piston and valve means and engage said first sealing surface with said first valve seat when said pressure differential falls below the predetermined amount, said first piston operable to disengage said second valve seat from said second sealing surface when the inlet pressure exceeds the charging pressure, a sleeve integral with said first sealing surface of said valve means, a passageway in said valve means across said first sealing surface and intersecting said sleeve, a pilot valve slidable in said sleeve, and a spring normally biasing said pilot valve to close said passageway, said pilot valve responsive to a predetermined maximum inlet pressure to open said passageway and establish limited pressure fluid communication between said inlet and exhaust ports, said first piston responsive to the pressure differential between said inlet and charging ports to re-engage said second valve seat and sealing surface and disengage said first valve seat and sealing surface to establish unlimited pressure fluid communication between said inlet and exhaust ports.

12. A valve for controlling flow from a source of fluid pressure comprising a housing having spaced bores therein, inlet and outlet ports in one of said bores and charging and exhaust ports in the other of said bores, a connecting port between said bores intermediate the ports thereof, means to concurrently adjust in opposite senses the rate of flow between said inlet port and said outlet and connecting ports, respectively, to substantially maintain a predetermined rate of flow to said outlet port and divert said flow in excess of said predetermined rate to said connecting port, and means responsive to predetermined maximum and minimum pressure differentials between said connecting and charging ports to selectively direct said flow in excess of said predetermined rate from said connecting port to said exhaust and charging ports, respectively.

13. A valve for controlling flow from a source of fluid pressure comprising a housing having first and second bores therein, spaced inlet and outlet ports in said first bore, and spaced charging and exhaust ports in said second bore, a connecting port between said first and second bores intermediate the spaced ports thereof, means in said first bore to maintain a predetermined rate of flow between said inlet and outlet ports and divert said flow in excess of said predetermined rate to said connecting port, and valve means in said second bore controlling communication between said connecting port and said charging and exhaust ports, respectively, said valve means being responsive to a predetermined minimum and maximum pressure differential between said connecting and charging ports to direct said flow in excess of said predetermined rate to said charging port and said exhaust port, respectively.

14. A valve for controlling flow from a source of fluid pressure comprising a housing having spaced bores therein, inlet and outlet ports in one of said bores and charging and exhaust ports in the other of said bores, a connecting port between said bores intermediate of the ports thereof, flow control means movable in said one of said bores to adjust the flow downstream and upstream of said flow control means in opposite senses to thereby maintain a predetermined rate of downstream flow to said outlet port and divert said upstream flow in excess of said predetermined rate to said connecting port, and valve means in the other of said bores controlling communication between said connecting port and said charging and exhaust ports, respectively, to direct said upstream flow to said charging or exhaust ports in response to the prevailing fluid pressure in said closed center system.

15. A valve for controlling flow from a source of fluid pressure comprising a housing having spaced bores therein, inlet and outlet ports in one of said bores and charging and exhaust ports in the other of said bores, a connecting port between said bores intermediate the ports thereof, a plunger slidable in said one of said bores and having an orifice therein, said plunger being responsive to a predetermined pressure differential across said orifice to substantially maintain a predetermined rate of flow between said inlet and outlet ports and divert said flow in excess of said predetermined rate to said connecting port, valve means in the other of said bores controlling communication between said connecting port and said charging and exhaust ports, respectively, means responsive to a predetermined maximum pressure at the charging port for moving said valve means to direct the excess flow to said exhaust port, and means for moving said valve means to direct the excess flow to said charging port when the pressure therein is reduced a predetermined amount.

16. A valve for controlling flow from a source of fluid pressure comprising a housing having spaced bores therein, inlet and outlet ports in one of said bores and charging and exhaust ports in the other of said bores, a connecting port between said bores intermediate of the ports thereof, a plunger slidable in one of said bores controlling said connecting and outlet ports, an orifice in said plunger to continuously communicate said inlet and outlet ports, said plunger being movable in response to a pressure differential across said orifice above or below a predetermined amount to maintain a predetermined rate of flow downstream of said orifice and divert said flow in excess of said predetermined rate upstream of said orifice to said connecting port, valve means in the other of said bores, said valve means being movable between two positions to control communication between said connecting, charging, and exhaust ports, valve seating means for sealable engagement with said valve means to preclude flow to said charging port, said valve seating means being responsive to a predetermined maximum pressure differential between said connecting and charging ports to move said valve means to a first position to direct the excess flow to said exhaust port, and resilient means for moving said valve means to a second position to preclude flow to said exhaust port and to direct said excess flow from said connecting port to said charging port when the pressure differential between said connecting and charging ports is reduced a predetermined amount.

17. A valve for controlling flow from a source of fluid pressure comprising a housing having first and second bores therein, inlet and outlet ports in said first bore, charging and exhaust ports in said second bore, a connecting port having one end intersecting said first bore intermediate said inlet and outlet ports and the other end thereof intersecting said second bore intermediate said charging and exhaust ports, first and second annular throttling grooves in said first bore connecting with said connecting and outlet ports, respectively, a plunger slidably received in said first bore and having a sleeve thereon controlling said first and second throttling grooves, a restricted orifice in said plunger to establish continuous flow between said inlet and outlet ports, said plunger being responsive to a pressure differential across said restricted orifice above and below a predetermined amount to move said sleeve into flow throttling position with the second throttling groove downstream of said orifice and into flow throttling position with the first throttling groove upstream of said orifice, respectively, whereby said upstream and downstream flows are concurrently adjusted in opposite senses to maintain a predetermined rate of flow downstream and divert said flow in excess of said predetermined rate upstream to said connecting port, valve means in said second bore controlling communication between said connecting, charging and exhaust ports, a seat for said valve means slidable in said second bore between said connecting and charging ports, said seat being responsive to a pressure differential between said upstream flow and charging port above a predetermined amount to normally maintain said valve means in a first position diverting said upstream flow from said connecting port to said exhaust port, a spring for biasing said valve means to a second position closing said exhaust port and diverting said upstream flow to said charging port when the pressure differential between said upstream flow and said charging port is reduced a predetermined amount, and pilot valve means responsive to a predetermined maximum pressure of said upstream flow to divert a limited portion of said upstream flow to said exhaust port and reduce the pressure of said upstream flow below that of said charging port, said second named means operable to return said valve means to the first position and divert the entire upstream flow to said exhaust port when the pressure of said upstream flow falls below the pressure of the closed center system.

18. In a fluid pressure system including a source of fluid pressure, an open center branch and a closed center branch, and means for controlling the flow from said source to said branches, said means comprising a flow control portion and an accumulator charging portion, first valve means in said flow control portion to concurrently adjust the rate of flow to said branches in opposite senses to maintain a predetermined rate of flow in said open center branch and simultaneously divert the flow in excess of said predetermined rate to said accumulator charging portion, and second valve mean in said accumulator charging portion responsive to a predetermined minimum and maximum pressure differential across said closed center branch to direct the excess flow into said closed center branch and to vent said excess flow to atmospheric pressure, respectively.

19. A charging valve comprising a housing having inlet, charging, and exhaust ports, valve means for controlling communication between said ports, means including said valve means responsive to a predetermined pressure differential between said inlet and charging ports to open communication between said inlet and exhaust ports, means operable to move said valve means to interrupt communication between said inlet and exhaust ports when said pressure differential is reduced a predetermined amount, said second named means being operable to establish communication between said inlet and charging ports when the pressure at the inlet port exceeds that at the charging port.

20. A charging valve comprising a housing having inlet, charging, and exhaust ports, valve means for controlling communication between said ports, spaced sealing surfaces on said valve means, a valve seat between said inlet and exhaust ports, a valve member responsive to a predetermined pressure differential between said inlet and charging ports to normally maintain engagement with one sealing surface and disengage the other sealing surface from said valve seat, means operable when said pressure differential is reduced a predetermined amount to engage said other sealing surface with said valve seat, said valve member being operable to disengage said one sealing surface when the pressure at the inlet port exceeds that at the charging port.

References Cited in the file of this patent

UNITED STATES PATENTS

| | | |
|---|---|---|
| 2,793,498 | Banker | May 28, 1957 |
| 2,799,996 | Van Meter | July 23, 1957 |
| 2,818,711 | Lincoln et al. | Jan. 7, 1958 |
| 2,846,850 | Hall | Aug. 12, 1958 |

FOREIGN PATENTS

| | | |
|---|---|---|
| 212,828 | Australia | Feb. 3, 1958 |